United States Patent
Tsai (10) Patent No.: US 11,891,151 B1
(45) Date of Patent: Feb. 6, 2024

(54) BICYCLE SHOCK ABSORBING AND BUFFERING STRUCTURE

(71) Applicant: Ming-Ta Tsai, New Taipei (TW)

(72) Inventor: Ming-Ta Tsai, New Taipei (TW)

(73) Assignee: DAH KEN INDUSTRIAL CO., LTD., New Taipei (TW)

( * ) Notice: Subject to any disclaimer, the term of this patent is extended or adjusted under 35 U.S.C. 154(b) by 0 days.

(21) Appl. No.: 17/942,184

(22) Filed: Sep. 12, 2022

(51) Int. Cl.
*B62K 3/02* (2006.01)
*B62K 25/08* (2006.01)
*F16F 9/34* (2006.01)

(52) U.S. Cl.
CPC ............. *B62K 25/08* (2013.01); *B62K 3/02* (2013.01); *F16F 9/3415* (2013.01); *F16F 2222/08* (2013.01); *F16F 2224/0225* (2013.01)

(58) Field of Classification Search
CPC ...... B62K 25/08; B62K 3/02; B62K 2201/02; F16F 9/585; F16F 9/3415; F16F 1/445; F16F 3/0876
See application file for complete search history.

(56) References Cited

U.S. PATENT DOCUMENTS

| | | | | |
|---|---|---|---|---|
| 5,193,833 A * | 3/1993 | Reisinger | ............... | B62K 25/08 267/141.1 |
| 5,284,352 A * | 2/1994 | Chen | ...................... | B62K 25/08 280/277 |
| 5,310,203 A * | 5/1994 | Chen | ...................... | B62K 25/08 267/141.1 |
| 5,445,366 A * | 8/1995 | Shih | ........................ | B62K 25/08 267/140.13 |
| 5,509,677 A * | 4/1996 | Bradbury | ............... | B62K 25/08 280/276 |
| 5,529,327 A * | 6/1996 | Huang | ...................... | F16F 1/40 267/141.1 |
| 5,667,234 A * | 9/1997 | Zirk | ........................ | B60G 17/02 267/141 |
| 5,848,799 A * | 12/1998 | Huan | ...................... | B62K 25/08 280/276 |
| 6,202,995 B1 * | 3/2001 | Jou | ........................ | B62K 25/08 267/140 |
| 2017/0305494 A1 * | 10/2017 | Tsai | ...................... | B62K 25/08 |

FOREIGN PATENT DOCUMENTS

WO WO-9615021 A2 * 5/1996 ............. B62K 25/08

* cited by examiner

*Primary Examiner* — Vishal R Sahni (57) ABSTRACT

A bicycle shock absorbing and buffering structure mounted on one side of a shock absorber tube is provided. The bicycle shock absorbing and buffering structure includes at least one foamed elastic block and at least one connecting base. The foamed elastic block has a through hole passing through two opposite ends thereof. The connecting base has a dividing plate, a connecting column extending outward from opposite sides of the dividing plate, and a center hole passing through the connecting column and the dividing plate. The connecting base is inserted into the through hole of the foamed elastic block with a connecting column, and the dividing plate is located at and stacks on the end of the foamed elastic block, and the through hole is communicated with the center hole, the foamed elastic block and the connecting base are strung together.

6 Claims, 7 Drawing Sheets

BICYCLE SHOCK ABSORBING AND BUFFERING STRUCTURE

FIELD OF THE DISCLOSURE

The present invention relates to a buffering structure, and particularly to buffering structure applied to a bicycle shock absorber.

BACKGROUND OF THE DISCLOSURE

The shock absorber of the bicycle can absorb the vibration from the bumpy road, which not only maintains stable driving and improves riding control but also reduces the burden transmitted to the rider's muscles, so as to reduce riding fatigue and muscle discomfort. Especially, during riding on rough road conditions (bumpy mountain roads or unpaved roads), the effect of the shock absorber is more pronounced.

In general, bicycle shock absorbers are mostly inner and outer tubes that pass through each other. When the shock absorber receives external force, the inner and outer tubes displace relative to each other and cooperate with the internal gas, oil pressure, spring, or the combination thereof to absorb shock from the ground. However, when the shock absorber hits bottom, it not only affects the riding stability but also directly damages the internal components of the shock absorber.

SUMMARY OF THE DISCLOSURE

The present disclosure provides a bicycle shock absorbing and buffering structure mounted on one side of a shock absorber tube, the bicycle shock absorbing and buffering structure includes at least one foamed elastic block and at least one connecting base. The foamed elastic block has a through hole that passes through two opposite ends. The connecting base has a dividing plate, a connecting column extending outward from opposite sides of the dividing plate, and a center hole passing through the connecting column and the dividing plate. The connecting base is inserted into the through hole of the foamed elastic block with a connecting column, and the dividing plate is located at and stacks the end of the foamed elastic block, and the through hole is communicated with the center hole, so that the foamed elastic block and the connecting base are strung together, so that the fluid in the shock absorber tube can flow through the center hole and the through hole.

In practice, when the shock absorber is contracted by an external force and displaced over the original load, the moving components inside of the shock absorber collide with the shock absorbing and buffering structure, and resulting in the foam elastic block being compressed and deformed. By transmitting the force to the compression and deformation of the foamed elastic block, the collision to the shock absorber and the damage to the internal components of the shock absorber can be avoided.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Referring to FIG. 1 to FIG. 7, the present disclosure provides a bicycle shock absorbing and buffering structure mounted on one side of a shock absorber tube 10, the bicycle shock absorbing and buffering structure includes at least one foamed elastic block 100 and at least one connecting base 200. The foamed elastic block 100 has a through hole 110 passing through two opposite ends thereof. The connecting base 200 has a dividing plate 210, a connecting column 220 extending outward from opposite sides of the dividing plate 210, and a center hole 230 passing through the connecting column 220 and the dividing plate 210. The connecting base 200 is inserted into the through hole 110 of the foamed elastic block 100 with a connecting column 220, and the dividing plate 210 is located at and stacks the end of the foamed elastic block 100, and the through hole 110 is communicated with the center hole 230, so that the foamed elastic block 100 and the connecting has 200 are strung together, so that the fluid in the shock absorber tube 10 can flow through the center hole 230 and the through hole 110.

The bicycle shock absorbing and buffering structure of the present disclosure is mounted in the shock absorber 1, the shock absorber 1 is a front fork as an example, the aforementioned fluid can be gas, and the aforementioned shock absorber tube 10 can be an inner tube. In one embodiment, three foamed elastic blocks 100 and two connecting bases 200 are strung together.

Figure 1:
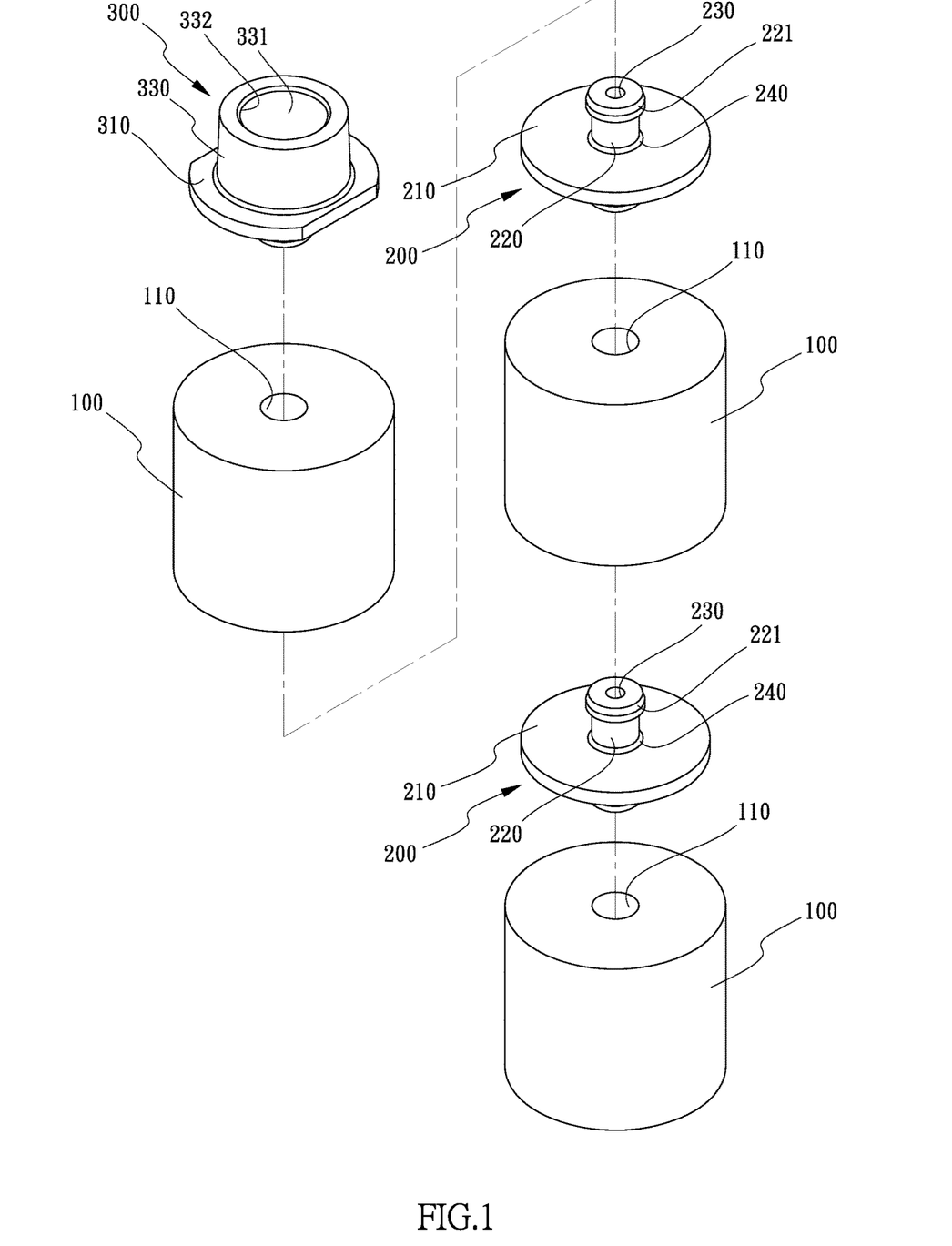
FIG. 1 is an exploded perspective schematic view of the bicycle shock absorbing and buffering structure oldie present disclosure.
Figure 2:
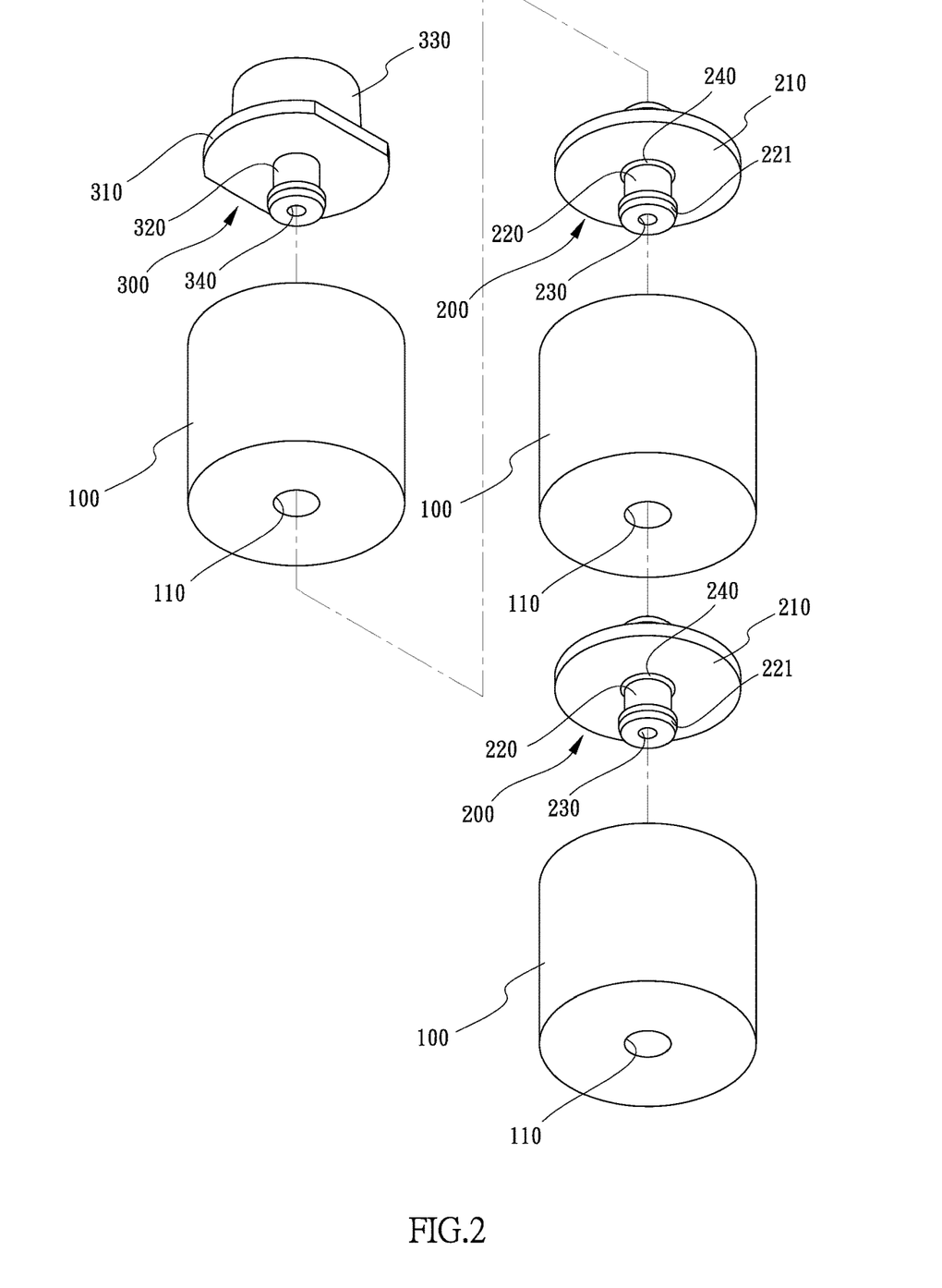
FIG. 2 is an exploded perspective schematic view of another angle of the bicycle shock absorbing and buffering structure of the present disclosure.
Figure 3:
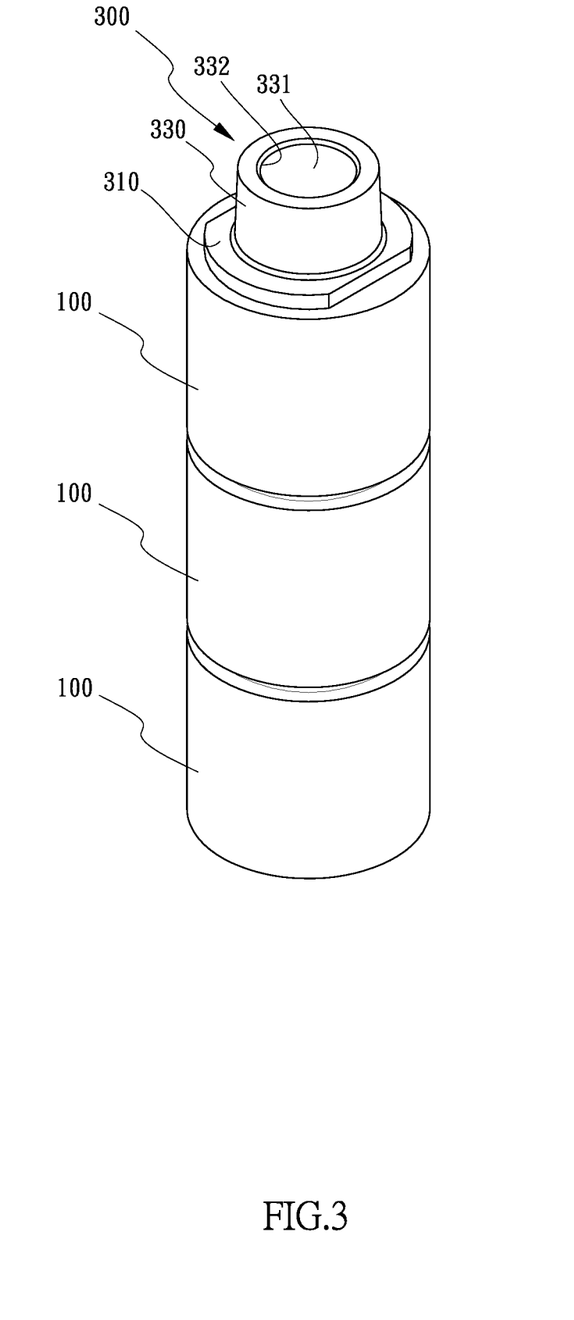
FIG. 3 is an assembled perspective view of the assembling the bicycle shock absorbing and buffering structure of the present disclosure.
Figure 4:
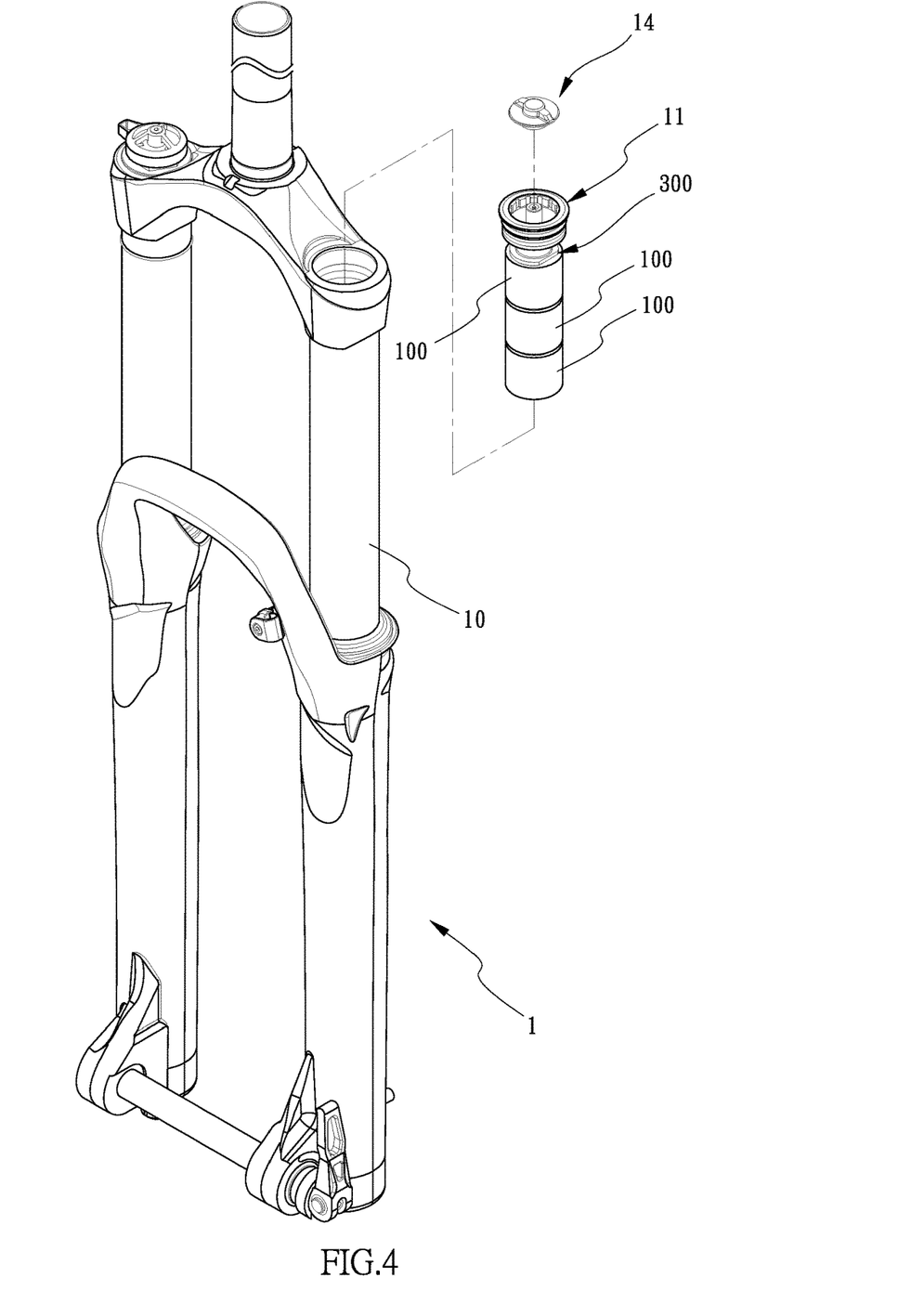
FIG. 4 is an exploded perspective schematic view of the bicycle shock absorbing and buffering structure of the present disclosure mounted on a shock absorber.
Figure 5:
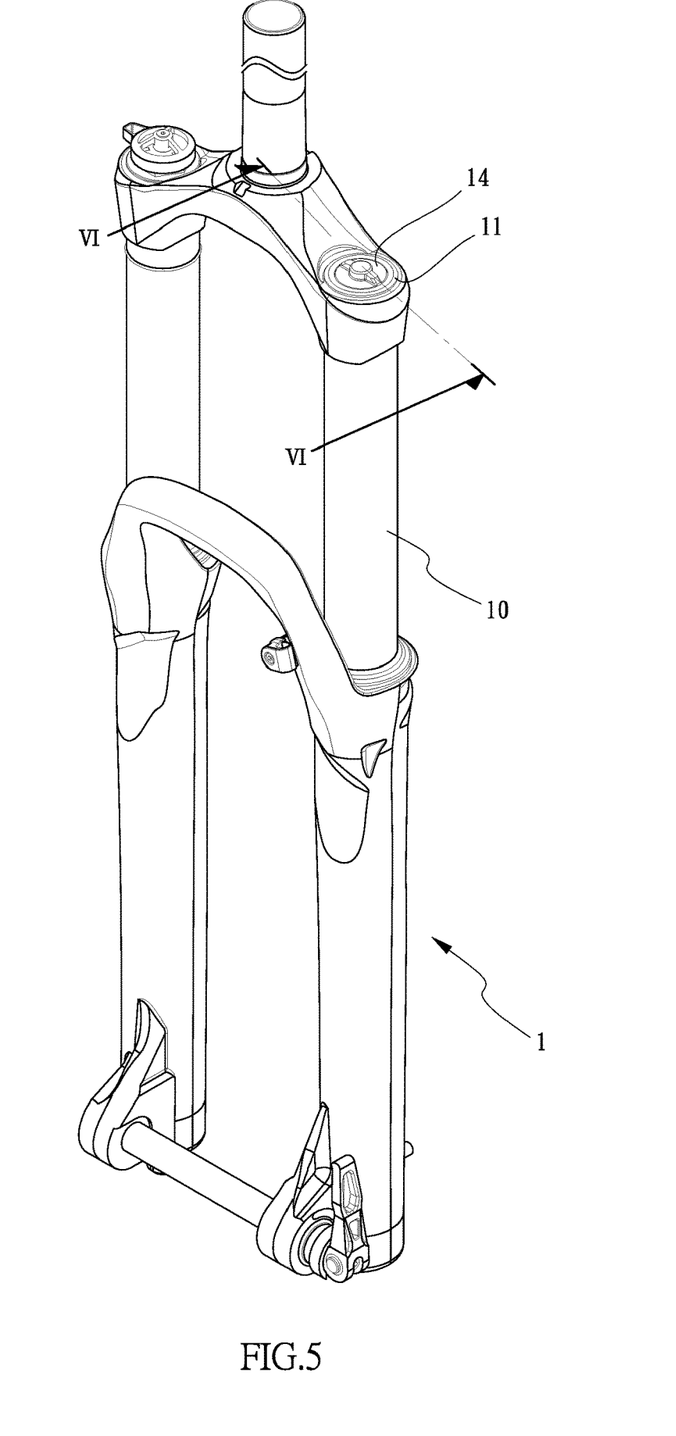
FIG. 5 is an assembled perspective schematic view of the bicycle shock absorbing and buffering structure of the present disclosure mounted on a shock absorber.
Figure 6:
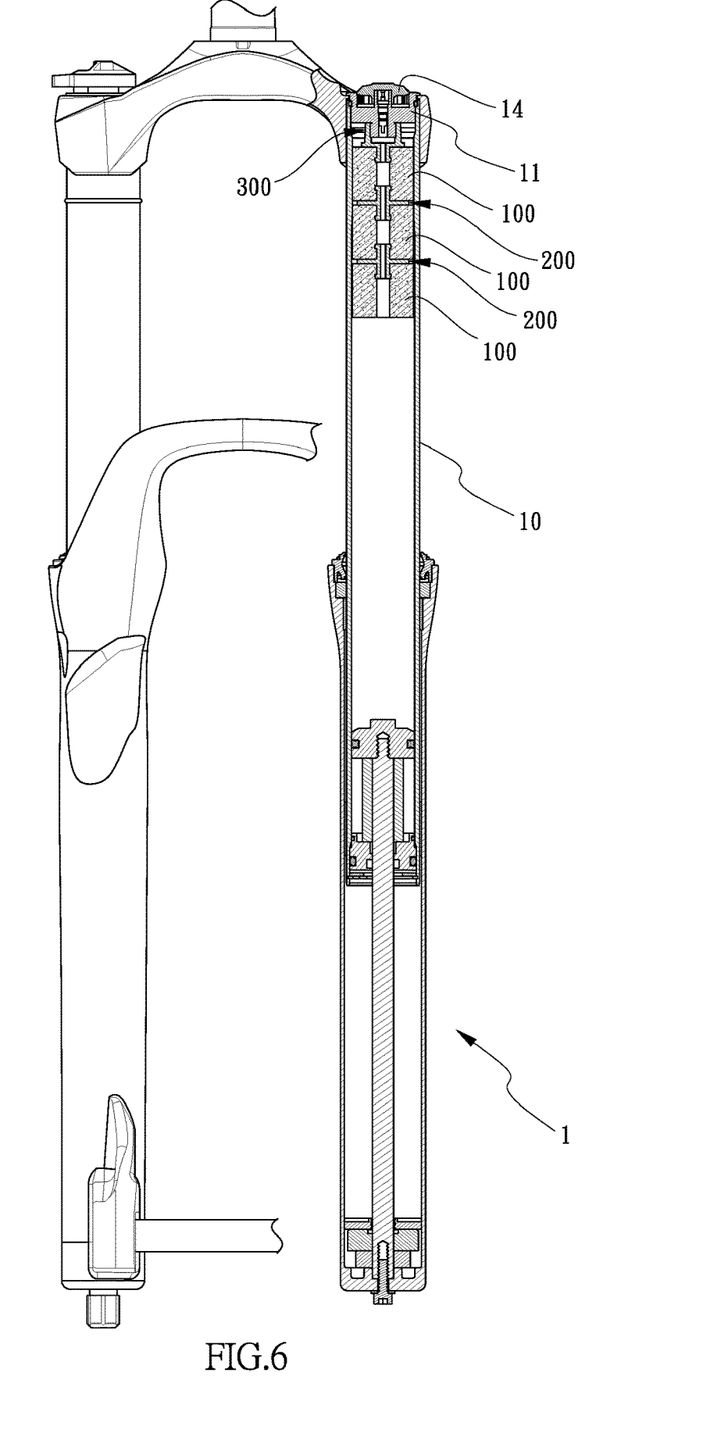
FIG. 6 is a sectional schematic view of FIG. 5.
Figure 7:
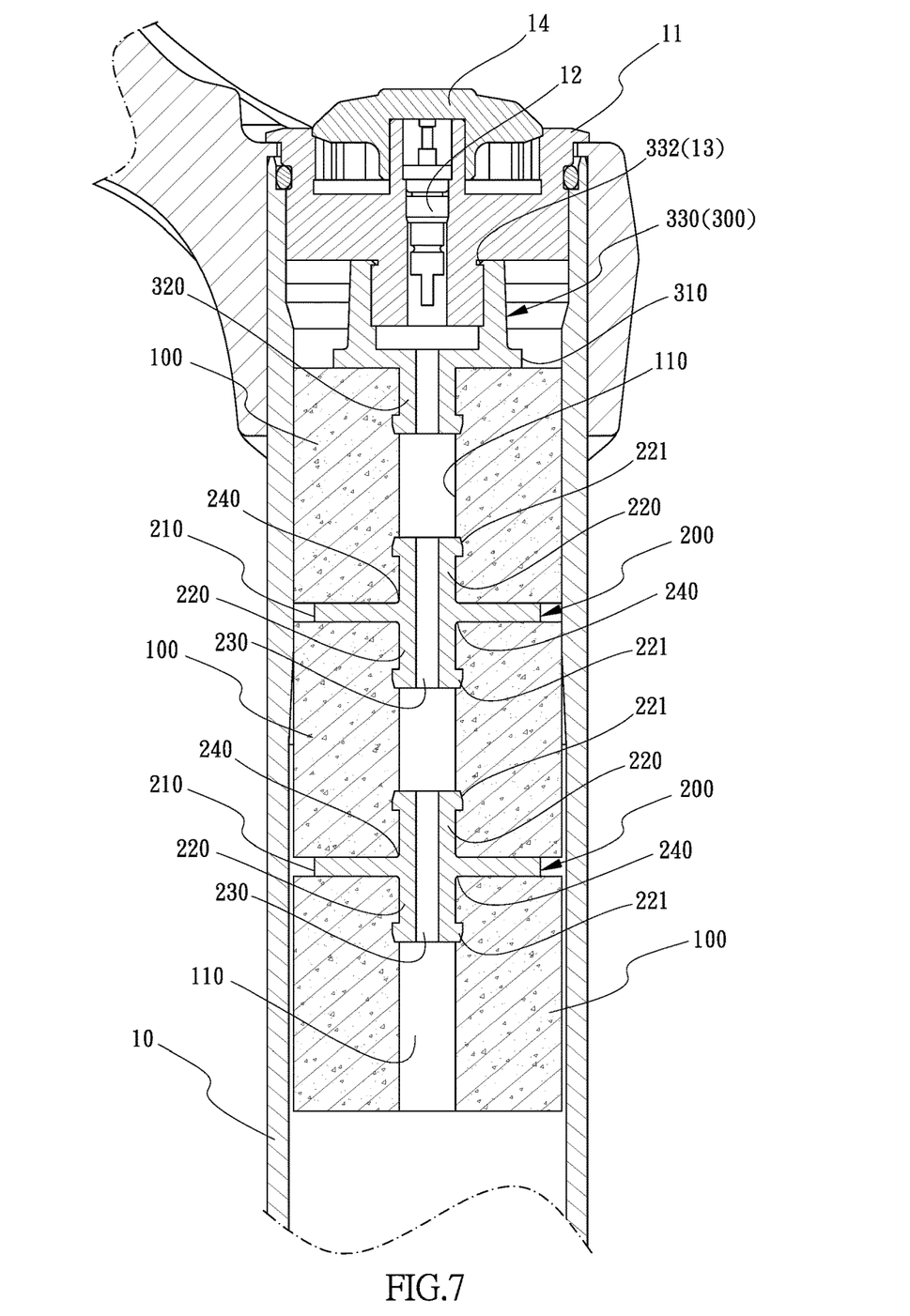
FIG. 7 is a partial enlarged schematic view of FIG. 5.

In practice, when the shock absorber 1 is contracted by an external force and displaced over the original load, the moving components inside of the shock absorber 1 collide with the shock absorbing and buffering structure, and resulting lowest the foam elastic block 100 as shown in FIG. 1 compressed and deformed, and part of force also transmits and deforms the upper foamed elastic blocks 200 through the connecting base 200. By transmitting the force to the compression and deformation of the foamed elastic block 100, the collision to the shock absorber 1 and the damage to the internal components of the shock absorber 1 can he avoided.

The detailed features of each element and its assembling of the present disclosure are described as follows. Further, the structure includes an adapter 300, in which the adapter includes a blocking plate 310, a convex column 320 and a sleeve column 330, the convex column 320 and the sleeve column 330 are respectively arranged on opposite sides of the blocking plate 310, and the convex column 320 is inserted in the through hole 110 of the foamed elastic block 100, and the sleeve column 330 is sleeved on a fixed base 11 of the shock absorber tube 10. The fixed base 11 is movable threadedly engaged to the upper side of the shock absorber tube 10, by the adapter 300, the string of the foamed elastic block(s) 100 and the connecting base(s) 200 can be mounted in the shock absorber 1, as shown in FIG. 4 to FIG. 7. Moreover, the structure is located near the upper side of the shock absorber 100, it is convenient for installation, subsequent disassembly, maintenance, and replacement of components.

In one embodiment, the fixed base 11 includes a gas nozzle 12, and the sleeve column 330 of the adapter 300 has a sleeve groove 331 communicating with the gas nozzle 12. Further, the adapter 300 has a penetrating hole 340 passing through the sleeve column 330 and the blocking plate 310, and the penetrating hole 340 is communicated with the sleeve groove 331 and the through hole 110. With these features, the structure provides the shock absorber 1 an inflatable function before or after leaving the factory. The inflator inputs gas through the gas nozzle 12, and the gas is filled into the shock absorber 1 (air chamber) through at least the gas nozzle 12, the sleeve groove 331, the penetrating hole 340, the through hole 110, and the passing hole 230. Even if the foamed elastic block 100 and the connecting base 200 are strung together, and mounted under the fixed base 11 by the adapter 300, filling the gas into the shock absorber 1 (air chamber) through the gas nozzle 12 would not be blocked. The aforementioned fixing base 11 is screwed to the inner wall of the shock absorber tube 10, and one end of the fixing base 11 protrudes and is exposed from the upper end of the shock absorber tube 10 (inner tube).

In one embodiment, the sleeve groove 331 has an inverted buckle ring 332 protruding from the peripheral side of the sleeve groove 331 and fastening an outer ring groove 13 of the fixed base 11.

In one embodiment, the fixed base 11 is movably sleeved with a gas nozzle cover 14 covering the gas nozzle 12. The movably arranged gas nozzle cover 14 can be used to protect the gas nozzle 12 at ordinary times, which can not only prevent dust and water from polluting the gas nozzle 12 and affect its function, but also prevent the gas nozzle 12 from being directly collision. When there is a need for gas inflation, the gas nozzle cover 14 can be removed, and the shock absorber 1 can be inflated through the gas nozzle 12 with the inflating device, then the gas nozzle cover 14 can be sleeved on the fixed base 11 after the gas inflation.

In one embodiment, the foamed elastic block 100 is in a hollow circular tube shape, and the dividing plate 210 of the connecting base 200 is in a flat circular plate shape. The radial dimension of the foamed elastic block 100 is larger than the radial dimension of the dividing plate 210, so that the dividing plate 210 is not exposed on the peripheral surface of the foamed elastic block 100, and the dividing plate 210 is distant from the inner wall of the shock absorber tube 10 than the peripheral side of the foamed elastic block 100. Therefore, the connecting base 200 will not touch the inner wall of the shock absorber tube 10 when the foamed elastic block 100 is compressed and deformed by force and cause the displacement of the connecting base 200. In this way, damage to the inner wall surface of the shock absorber tube 10 can be avoided when the connecting seat 200 is displaced. In this way, damage to the inner wall surface of the shock absorber tube 10 can be avoided when the connecting base 200 is displaced.

In one embodiment, the peripheral side of the end of the connecting column 220 of the connecting base 200 has an inverted buckle portion 221 protruding outwardly. With the inverted buckle portion 221, when the connecting column 220 inserts into the through hole 110 of the foamed elastic block 100, the hole wall of the through hole 110 forms a receiving cavity, so that the assembling is tight and not easy to he separated.

In one embodiment, the connecting base 200 further includes at least one reinforcing annular rib 240 disposed between the connecting column 220 and the dividing plate 210. By the reinforcing annular rib 240 disposed between the connecting column 220 and the dividing plate 210, the structural strength of the connection between the connecting column 220 and the partition plate 210 can be strengthened, so that the defects in which cracks or fractures occur between the connecting column 220 and the dividing plate 210 when subjected to force can be reduced.

It is worth mentioning that the foamed elastic block 100 is made of polyurethane (PU), and the connecting base is made of hard rubber.

What is claimed is:

1. A bicycle shock absorbing and buffering structure mounted on one side of a shock absorber tube, comprising:
   at least one foamed elastic block having a through hole passing through two opposite ends thereof;
   at least one connecting base having a dividing plate, a connecting column extending outward from opposite sides of the dividing plate, and a center hole passing through the connecting column and the dividing plate; and
   an adapter, wherein the adapter includes a blocking plate, a convex column and a sleeve column; wherein the convex column and the sleeve column are respectively disposed on opposite sides of the blocking plate, the convex column is inserted in the through hole of the at least one foamed elastic block, and the sleeve column is sleeved on a fixed base of the shock absorber tube;
   wherein the at least one connecting base is inserted into the through hole of the at least one foamed elastic block by the connecting column, the dividing plate is located at and stacks one end of the at least one foamed elastic block, and the through hole is communicated with the center hole, so that the at least one foamed elastic block and the at least one connecting base are strung together;
   wherein the fixed base includes a gas nozzle, and the sleeve column of the adapter has a sleeve groove communicating with the gas nozzle, wherein the adapter has a penetrating hole passing through the sleeve column and the blocking plate, and the penetrating hole is communicated with the sleeve groove and the through hole.

2. The bicycle shock absorbing and buffering structure according to claim 1, wherein the sleeve groove has an inverted buckle ring protruding from a peripheral side of the sleeve groove and fastening an outer ring groove of the fixed base.

3. The bicycle shock absorbing and buffering structure according to claim 1, wherein the fixed base is movably sleeved with a gas nozzle cover covering the gas nozzle.

4. The bicycle shock absorbing and buffering structure according to claim 1, wherein a peripheral side of one end of the connecting column of the at least one connecting base further includes an inverted buckle portion protruding outwardly.

5. The bicycle shock absorbing and buffering structure according to claim 1, wherein the at least one connecting base further includes at least one reinforcing annular rib disposed between the connecting column and the dividing plate.

6. The bicycle shock absorbing and buffering structure according to claim 1, wherein the at least one foamed elastic block is made of polyurethane.

* * * * *